Sept. 17, 1940.　　　J. A. SCHMITT　　　2,215,017
PUMP VALVE ASSEMBLAGE
Filed Nov. 17, 1937　　　2 Sheets-Sheet 2
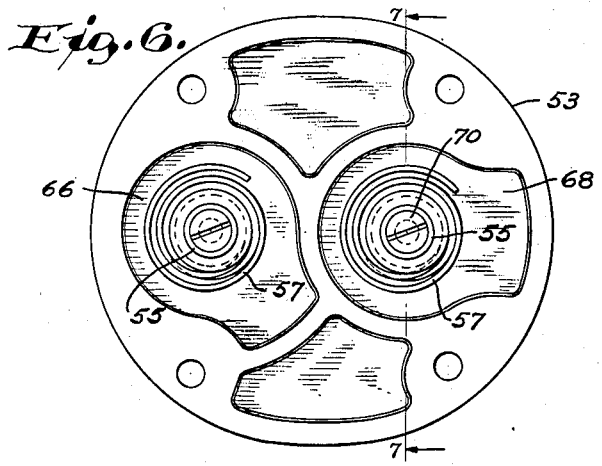
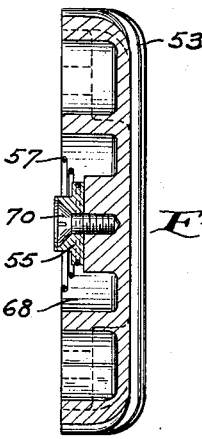
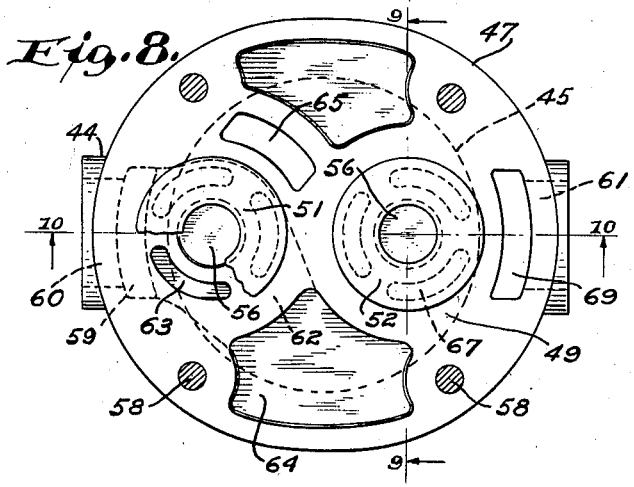
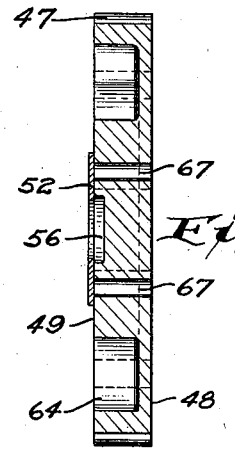
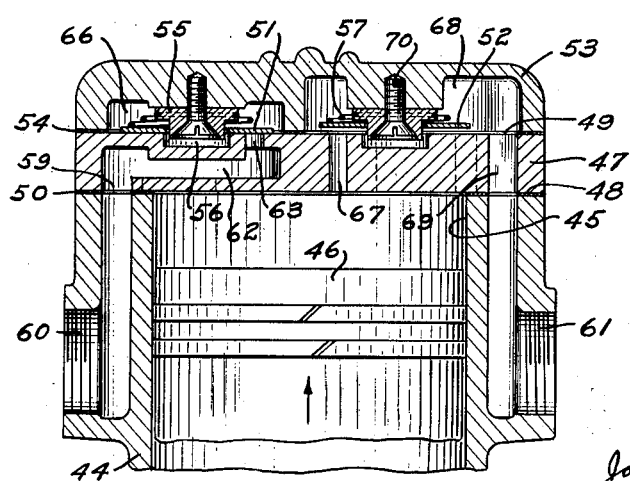
INVENTOR.
John A. Schmitt
BY Morsell, Lieber & Morsell
ATTORNEYS.

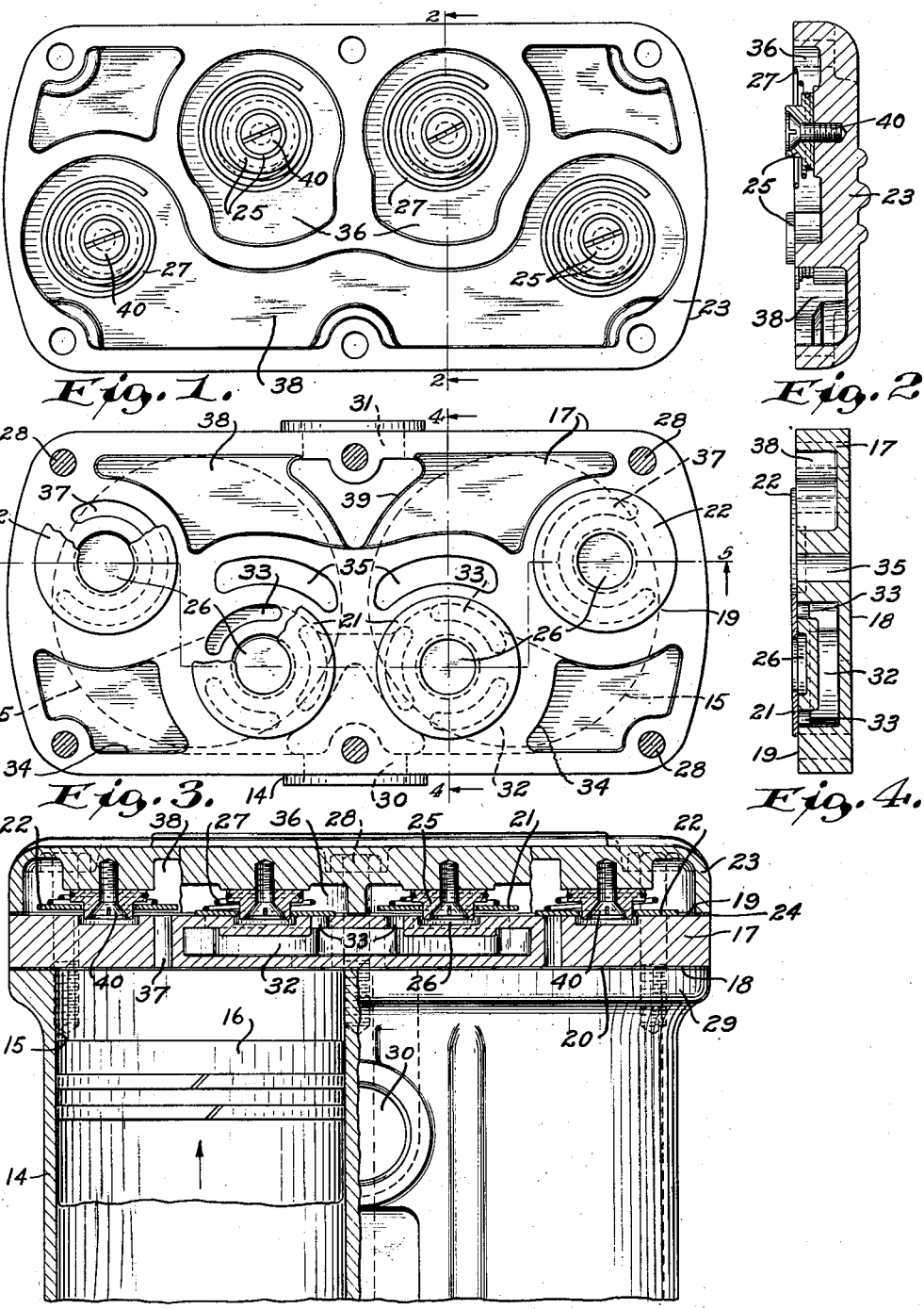

Patented Sept. 17, 1940

2,215,017

UNITED STATES PATENT OFFICE 2,215,017

PUMP VALVE ASSEMBLAGE

John A. Schmitt, Waukesha, Wis., assignor to The Universal Milking Machine Company, Waukesha, Wis., a corporation of Wisconsin Application November 17, 1937, Serial No. 175,026

2 Claims. (Cl. 230—228)

The present invention relates generally to improvements in fluid pumps of the positive displacement type, and relates more specifically to improvements in the construction and operation of the inlet and exhaust valve assemblages for such pumps.

Generally defined, an object of my present invention is to provide an improved valve assemblage for fluid pumps, which is simple and compact in construction as well as being highly efficient in operation.

It is common commercial practice to utilize so-called disk or plate valves for controlling the suction and discharge of positive displacement air compressors and vacuum pumps. Each of these valves ordinarily comprises a relatively light annular disk or flat plate, which is normally pressed against its seating by means of a helical spiral spring coacting with the back of the valve; and it is desirable in order to reduce the clearance volumes to a minimum, to have these valves located as near as possible to the piston displacement chambers. Due to the relatively large diameter of these plates valves required for a predetermined cylinder diameter, it is difficult to locate both the inlet and outlet valve in the same plane directly at the end of the cylinder and within the border of the cylinder head, although such disposition of the valves is most desirable. By locating the valves in alinement with the piston and closely adjacent the displacement chamber, the clearance space may be minimized; and by disposing both valves in the same plane, the valve seats may be most conveniently dressed or ground, and both valves are made more readily accessible and easy to assemble and dismantle. The disposition of the valves within the normal diameter and confines of the cylinder head, also provides a more compact and neater assemblage devoid of hideous projections, and reduces the cost of manufacture of the assemblage to a minimum.

It is therefore a more specific object of my present invention to provide an improved plate valve assemblage wherein both the inlet and discharge valve for each cylinder, may be readily located directly at the end of the corresponding displacement chamber, and may also be made to cooperate with readily machinable seats disposed in the same plane.

Another specific object of the invention is the provision of a new and useful pump valve assemblage especially applicable to vacuum pumps, wherein plate or disk type admission and exhaust valves for each cylinder are confined well within the periphery of a head of minimum size, thus producing an extremely compact and neat assemblage.

A further specific object of this invention is the provision of an improved suction and discharge valve assemblage for single or multi-cylinder pumps, in which the valves are conveniently accessible for inspection or replacement, and which may be quickly assembled or dismantled.

Still another specific object of my invention is to provide an improved head and valve assemblage for positive displacement pumps wherein all valves are of like construction, and which may be manufactured and sold at moderate cost.

These and other specific objects and advantages of the present invention will be apparent from the following description.

A clear conception of several embodiments of my invention, and of the mode of constructing and of operating several types of valve assemblages built in accordance with the improvement, may be had by referring to the drawings accompanying and forming a part of this specification wherein like reference characters designate the same or similar parts in the various views.

Fig. 1 is a bottom view of the outer head member of a twin cylinder pump, showing the valve engaging springs and fluid passages associated therewith;

Fig. 2 is a transverse vertical section through the outer head member of Fig. 1, taken along the line 2—2;

Fig. 3 is a top view of the cylinders and of the inner head member of the same pump, showing the valves in normal position, and portions of some of these valves broken away;

Fig. 4 is a transverse vertical section through the inner head member of Fig. 3, taken along the line 4—4;

Fig. 5 is an irregular longitudinal section through the assembled valve confining heads and a portion of the twin cylinders, the section being taken along the line 5—5 of Fig. 3;

Fig. 6 is a bottom view of the outer head member of a single cylinder pump, showing the valve engaging springs and passages associated therewith;

Fig. 7 is a transverse vertical section through the outer head member of Fig. 6, taken along the line 7—7;

Fig. 8 is a top view of the cylinder and of the inner head member of the single cylinder pump, showing the valves in normal position with portions thereof broken away;

Fig. 9 is a transverse vertical section through the inner head member of Fig. 8, taken along the line 9—9; and Fig. 10 is a longitudinal vertical section through the assembled valve confining heads and through the single cylinder cooperating with these heads, the section being taken along the line 10—10 of Fig. 8.

While my invention has been shown and described herein as being specifically embodied in twin and single cylinder single acting vacuum pumps of the positive displacement type having annular disk suction and discharge valves, it is not intended to thereby unnecessarily restrict the scope.

Referring to Figs. 1 to 5 inclusive of the drawings, the twin cylinder vacuum pump shown therein comprises in general a main casing or upright cylinder 14 having therein two parallel bores 15 forming displacement chambers for pistons 16 which are reciprocable in the bores 15 in a well-known manner; a relatively thin and flat inner head member 17 enclosing the adjacent upper ends of both of the bores 15, and having lower and upper plane surfaces 18, 19, the lower of which coacts with the upper plane end of the cylinder 14 through a sealing gasket 20, and the upper of which provides a seating for the inlet and outlet disk valves 21, 22 respectively; a relatively flat outer head member 23 coacting through another sealing gasket 24 with the upper plane seating surface 19, and enclosing the valves 21, 22; cylindrical elements 25 carried by the outer head member 23 and forming guiding and positioning projections piercing the valves 21, 22 and extending into circular recesses 26 in the inner member 17; spiral helical springs 27 attached to and embracing the elements 25, and coacting with the valves 21, 22 to urge the same against the seating surface 19; and studs or cap screws 28 for clamping the members 17, 23 and the gaskets 20, 24 in position.

The cylinder block or casing 14 is formed of a single casting having a narrow flange 29 at its upper end, and is provided with integral suction and discharge passages 30, 31 respectively, located midway between the two bores 15 and on opposite sides of the casing 14. The inner flat head member 17 is provided with a chamber 32 which is in open communication with the suction passage 30 at the bottom, and with the inlet valves 21 at the seating surface 19 through ports 33 at the top; and this chamber has relatively large end openings 34 which are closed and sealed by the upper gasket 24 when the structure is assembled. The end openings 34 serve to anchor the core for the chamber 32 during casting of the member 17, and this member is additionally provided with suction openings or ports 35 which directly connect the cylinder bores 15 with the spaces 36 in the outer head member 23 within which the suction valves 21 are housed. The inlet valves 21 which are constantly urged against the seating surface 19 by the springs 27 coacting therewith, are obviously adapted to be lifted from the surface 19 as shown at the right in Fig. 5, when the pistons 16 move downwardly, thereby permitting fluid to flow through the passage 30, chamber 32, ports 33, spaces 36, and ports 35 into the cylinders for subsequent compression or discharge.

The inner head member 17 is also provided with outlet or exhaust ports 37 extending directly from the surface 18 to the seating surface 19 beneath each outlet valve 22, and these valves 22 are housed within a common space 38 formed in the inner and outer head members 17, 23, and are likewise constantly urged against the seating surface 19 by the corresponding springs 27. The discharge space 38 is in open communication with the discharge passage 31 through an opening 39 in the member 17, thus causing compressed fluid to flow through the ports 37, space 38, opening 39, and passage 31 when the valves 22 are lifted as shown at the left of Fig. 5, during the compression strokes of the corresponding pistons 16. The inlet valves 21 will naturally be closed by the springs 27 and the pressure from within the cylinders acting thereon through the ports 35 and spaces 36, during the compression strokes, and the outlet valves 22 will likewise be closed by the spring and fluid pressures and the suction acting thereon during the suction strokes of the pistons 16.

The springs 27 are attached to the corresponding adjacent valve guiding elements 25 as illustrated in Fig. 5, and these elements 25 may be secured to the member 23 by means of screws 40. The cylindrical lower portions of the elements 25 which pierce the adjacent annular disk valves 21, 22 and extend into the recesses 26 when the members 17, 23 are assembled, have external diameters slightly less than the internal diameters of the valves 21, 22 so as to permit free vertical movement of the latter while preventing undesirable lateral displacement thereof. The head members 17, 23 are of the same size and shape, as the cylinder flange 29, and in order to insure proper assembly of the head and cylinder block, one of the studs or cap screws 28 may be slightly offset, as shown in Figs. 1 and 3. It is also important to note that while the inlet and outlet valves 21, 22 are of relatively large diameter, the effective areas thereof are disposed substantially within the projected bores 15 of the cylinders with which they cooperate, and all of the valves 21, 22 coact with the common plane seating surface 19.

During normal operation of the pump illustrated in Figs. 1 to 5 inclusive, the two pistons 16 are being reciprocated at the same speed but in opposite directions, so that one of these pistons is traversing its suction stroke during the discharge stroke of the other. During the suction stroke of each piston 16, fluid is drawn by suction through the passage 30, chamber 32 and corresponding ports 33, past the suction or inlet valve 21, and from thence through the corresponding space 36 and port 35 into the displacement portion of the cylinder bore 15. As the piston 16 reverses and proceeds on its discharge stroke, the fluid and spring pressures quickly close the suction valve 21, and the corresponding discharge valve 22 is immediately opened by fluid forced through the ports 37. The fluid under pressure then flows through the space 38 and opening 39 to the final discharge passage 31, and this cycle of operations is continuously repeated so that the twin pump will constantly draw fluid through the passage 30 and will deliver the fluid through the passage 31.

Referring more specifically to Figs. 6 to 10 inclusive, the single cylinder vacuum pump disclosed therein comprises in general a main casing or cylinder 44 having therein a bore 45 forming a displacement chamber for a reciprocable piston 46; a relatively thin inner head member 47 enclosing the upper end of the bore 45, and having lower and upper plane parallel surfaces 48, 49 the lower of which coacts through a gasket 50 with the upper plane end surface of the cylinder 44, and the upper of which provides a common seating for the inlet and outlet disk valves 51, 52, respectively; a relatively flat outer head member 53 coacting through another sealing gasket 54 with the upper plane seating surface 49, and forming an enclosure for the valves 51, 52; cylindrical guide elements 55 secured to the outer member 53 and forming guiding and positioning projections extending through the valves 51, 52 and into circular recesses 56 in the inner member 47; spiral helical springs 57 encircling the elements 55 and coacting with the valves 51, 52 to press the same against the seating surface 49; and studs or cap screws 58 for clamping the head members 47, 53 and the gaskets 50, 54 in assembled position.

The cylinder block or casing 44 is preferably formed by casting, and is provided with integral suction and discharge passages 60, 61 located at the opposite sides thereof as shown in Figs. 8 and 10. The inner head member is provided with an internal chamber 62 which is in open communication with the suction passage 60 through an opening 59, and with the inlet valve 51 through suction ports 63; and the chamber 62 has a relatively large end opening 64 which is normally sealed by the gasket 54 when the head members are assembled. The inner member 47 is also provided with a suction port 65 which connects the cylinder bore 45 with a space 66 formed in the outer member 53 and within which the inlet valve 51 is confined. The inlet or suction valve 51 which is constantly urged against the common seating surface 49 by one of the springs 57, is obviously adapted to be lifted from the surface 49, when the piston 46 moves downwardly, thereby permitting fluid to flow through the passage 60, opening 59, chamber 62, ports 33, space 66, and ports 65 into the interior of the cylinder.

The inner head member 47 is additionally provided with outlet or exhaust ports 67 extending from the interior of the cylinder to the seating surface 49 beneath the outlet valve 52, and the valve 52 is housed within a space 68 formed in the outer head member 53 and is likewise constantly urged against the common seating surface 49 by one of the springs 57. The discharge space 68 is in open communication with the discharge passage 61 through an opening 69 formed in the member 47, thus permitting compressed fluid to flow through the ports 67, space 68, and opening 69 to the passage 61, when the discharge valve 52 is elevated as shown in Fig. 10. The inlet valve 51 will naturally be closed by the spring 57 coacting therewith, and by the pressure from within the cylinder acting thereon through the port 65 and space 66, during the compression stroke of the piston 46, and the outlet valve 52 will likewise be closed by the spring and fluid pressures, and by the suction acting thereon, during the suction stroke of the piston.

The springs 57 are attached to their respective valve guiding elements 55, as shown in Fig. 10, and these elements 55 may be detachably secured to the member 53 by means of screws 70. The cylindrical lower portions of the elements 55 extend into the recesses 66 when the member 47, 53 are assembled, and the elements have external diameters slightly less than the internal diameters of the corresponding valves 51, 52 so as to permit free vertical movement of the latter while preventing undesirable lateral displacement thereof. The head members 47, 53 are of the same external size and shape, as the upper end of the cylinder 44, and in order to insure proper assembly of the head and cylinder block, one of the fastening screws 58 may be slightly offset as shown in Figs. 6 and 8. It is also noteworthy that while the inlet and outlet valves 51, 52 are of relatively large diameter, the effective areas thereof are located substantially within the projected bore 45 of the cylinder 44, and both of the valves 51, 52 are of identical construction and coact with the common plane seating surface 49.

During normal operation of the pump illustrated in Figs. 6 to 10 inclusive, the piston 46 is being reciprocated, and during the suction stroke of this piston, fluid is drawn by suction through the passage 60, opening 59, chamber 62, and ports 63, past the inlet valve 51, and from thence through the space 66 and port 65 into the displacement chamber of the cylinder. As the piston 46 reverses its direction of travel and proceeds in the opposite direction, the fluid and spring pressures quickly close the suction valve 51 and the discharge valve 52 is immediately opened by the fluid being forced through the ports 67. The fluid under pressure, after passing the outlet valve 52, flows through the space 68, and opening 69 to the final discharge passage 61, and the cycle of operations is continuously repeated in a well-known manner.

From the foregoing detailed description of the twin and single cylinder pumps, it will be apparent that the present invention provides an extremely simple, compact and efficient assemblage wherein the clearance volumes are reduced to a minimum by virtue of the location of the inlet and discharge valves closely adjacent to the displacement chamber. The inner head member in each case may be readily manufactured by virtue of the location of all of the valve seatings in a common plane, thus permitting simultaneous grinding or dressing of all of the valve seats with a single operation. The provision of the outer head member with the valve guides and springs attached directly thereto, obviously facilitates assembly and dismantling of the structure, and not only permits convenient access to the valves, but to the interior of the cylinder as well. The improved structure also permits the use of valves of identical and interchangeable construction, both for inlet and exhaust purposes, and the improved head assemblage is obviously devoid of unsightly projections extending beyond the cylinder head flange. My invention permits the use of desirably large disk valves for the purpose of controlling the suction and discharge, while maintaining these valves effectively confined within the confines of a relatively small head structure, and the improvement has proven highly successful in actual commercial use, especially in conjunction with vacuum pumps for milking machines or the like.

It should be understood that it is not desired to limit this invention to the exact details of construction or to the precise mode of operation, herein shown and described, for various modifications within the scope of the claims may occur to persons skilled in the art.

I claim:

1. In combination, a pump cylinder having a bore, a relatively thin and flat one-piece seating member coacting with said cylinder to enclose said bore, said member being provided with suction and discharge ports disposed entirely within the projected area of said bore and having a single outer plane bounding surface and being devoid of projections extending outwardly beyond the plane of said surface, independent interchangeably similar inlet and outlet disk valves all normally seating directly on said surface at said ports and being guided for bodily movement away from and parallel to said surface during opening thereof, and a one-piece closure member enclosing said valves in segregated chambers and having a plane surface coacting with said seating member surface around and closely adjacent to each of said valves, said valves being located closely adjacent to each other and approximately within the projected area of said bore.

2. In combination, a pump cylinder having a bore, a relatively thin and flat one-piece seating member coacting with said cylinder to enclose said bore, said member being provided with suction and discharge ports disposed entirely within the projected area of said bore and having a single outer plane bounding surface and being devoid of projections extending outwardly beyond the plane of said surface, independent interchangeably similar inlet and outlet disk valves all normally seating directly on said surface at said ports and being guided for bodily movement away from and parallel to said surface during opening thereof, independent interchangeably similar helical spiral springs coacting with said valves to urge the same toward said surface, and a one-piece closure member enclosing said valves and springs in segregated chambers and having a plane surface coacting with said seating member surface around and closely adjacent to each of said valves and its spring, said valves being located closely adjacent to each other and approximately within the projected area of said bore.

JOHN A. SCHMITT.